United States Patent [19]
Vooght

[11] 3,821,759
[45] June 28, 1974

[54] UNDER WATER CAMERA BOX

[76] Inventor: Frank Vooght, c/o George Spector, 3615 Woolworth Bldg., 233 Broadway, New York, N.Y. 10007

[22] Filed: Aug. 9, 1972

[21] Appl. No.: 278,949

[52] U.S. Cl. .............................. 95/11 UW
[51] Int. Cl. ............................ G03b 17/08
[58] Field of Search ................ 95/11 UW

[56] References Cited
UNITED STATES PATENTS
2,855,826  10/1958  Jayet .................. 95/11 UW
2,901,143  8/1959  Pope .................... 95/11
FOREIGN PATENTS OR APPLICATIONS
1,043,770  7/1953  France ................ 95/11
1,065,959  4/1954  France ................ 95/11

Primary Examiner—John M. Horan

[57] ABSTRACT

A waterproof box containing a photographic camera to permit it being submerged underwater for taking pictures beneath the water surface, the box consisting of a case having windows so to permit the camera lens to see out of the box, and the case having a panel on its side which is integral with a waterproof glove that extends inwardly into the box so that a person can place his hand into the glove and manipulate the camera adjustments inside the box without letting water enter.

1 Claim, 5 Drawing Figures

PATENTED JUN 28 1974　　　　　　　　　　　　　　3,821,759
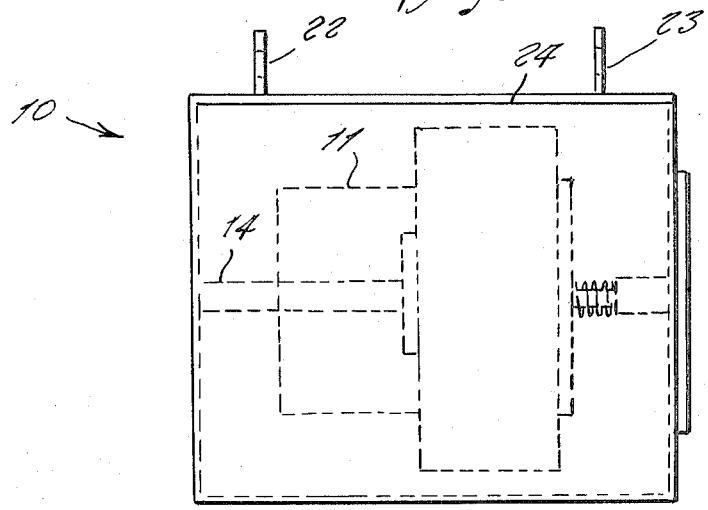
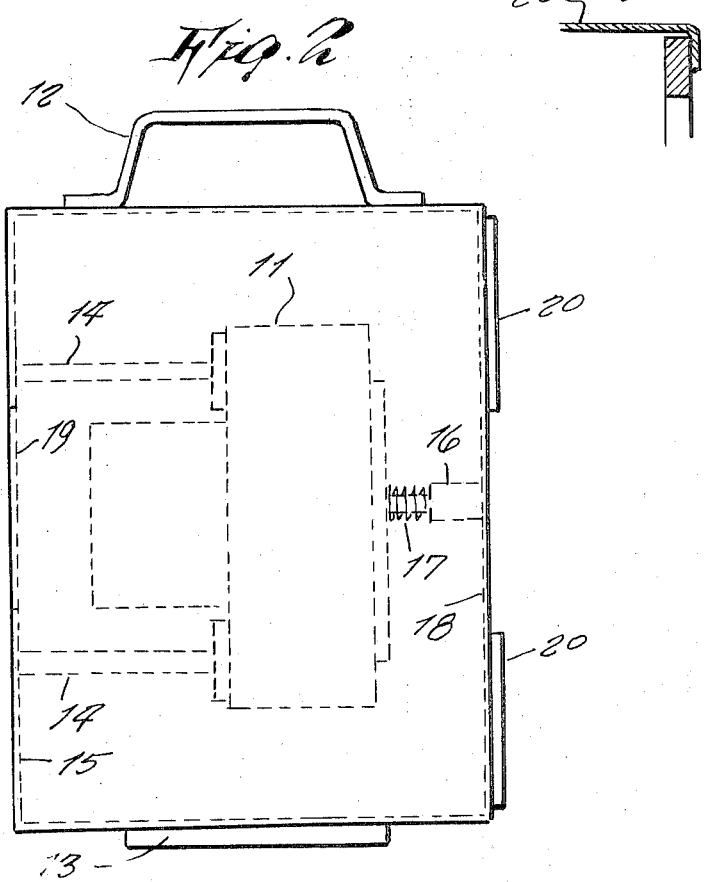
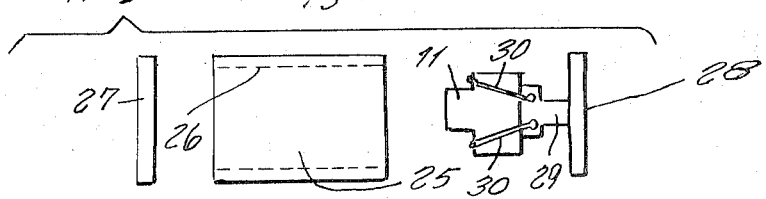

UNDER WATER CAMERA BOX

This invention relates generally to camera accessories.

A principle subject of the present invention is to provide a waterproof case within which an ordinary photographic camera can be placed so that it can be submerged in water so to take underwater pictures.

Another object is to provide a waterproof case having windows so that the camera lens can see out of the case, and so a person can see the camera inside the case, so that the camera adjustments can be seen.

Yet another object is to provide an underwater camera box which has a flexible waterproof glove formed on a wall of the box, the glove extending inwardly into the box so that a person may fit his hand into the glove and thus manipulate the camera adjustments without any water getting inside.

Other objects are to provide an UNDERWATER CAMERA BOX which is simple in design, inexpensive to manufacture, rugged in construction, easy to use and efficient in operation.

These and other objects will be readily apparent upon a study of the following specification and the accompanying drawing wherein:

FIG. 1 is a top view showing one design of the invention.

FIG. 2 is a side view thereof.

FIG. 3 is a fragmentary detail thereof.

FIG. 4 is a diagramatic view showing the glove panel in use.

FIG. 5 is an exploded view of a modified design of the invention.

Referring now to the drawing in detail, and more particularly at this time to FIGS. 1 to 3, the reference numeral 10 represents an underwater camera box according to the present invention and within which, any ordinary camera 11 can be placed so to take underwater pictures while the camera is kept dry.

The box 10 shown in FIGS. 1 and 2 is a square or rectangular case made of plastic or other material and is made waterproof so that when submerged in water, no water will enter the case interior.

A camera handle 12 is secured on top of the case A lead weight 13 on the bottom of the box decreases the box bouyancy.

The camera within the case is stationarily secured in position by means of two supports 14 being propped between a front side of the camera and the inner side of the box front wall 15. A plunger 16 is spring loaded by a coil spring 17, so to bear against a rear side of the camera and the inner side of the rear well 18 of the case. A glass window 19 mounted in the front wall 18 of the case. A glass window 19 mounted in the front wall 15 allows the camera lens to see out of the box.

Resilient panels 20 are mounted on the wall 18 so to seal opening made in the wall. Each resilient panel made preferably of waterproof rubber is integral with a flexible rubber glove 21 that extends inwardly into the box interior. Sights 22 and 23 are mounted upon a removable top panel that is secured on a side 24 of the box.

In operative use, a person can place the box underwater, and by placing his hands in the gloves can operate the camera adjustments and trip the camera shutter, and no water can get to the camera.

In FIG. 4 a modified design of the invention comprises a cylindrical shaped case 25 made of plastic and having an opening 26 therethrough. A transparent clear glass or plastic circular plate 27 is secured over a front of the case, and another transparent, clear glass or plastic circular plate 28 is secured over a rear of the case. A support 29 secured to an inner side of plate 28 serves to secure the camera 11 thereto by means of suitable elastic straps 30. The resilient panels with integral flexible, waterproof gloves are secured on plate 28 or on the cylindrical side of the case 25.

In this form of the invention, the operator can see directly through the cylindrical box and also through the camera's own view finder. Alternately, sights can be engraved on both front and rear plates 27 and 28 for being aligned with each other. Thus another design of the invention has been provided.

While various changes may be made in the detail construction, it is understood that such changes will be within the spirit and scope of the present invention.

I claim as follows:

1. An underwater camera box comprising a waterproof case having a front panel with a central transparent window and an opposing aligned rear panel in combination with a resilient side wall integral with a rubber glove in said rear panel providing waterproof manual access to the interior in further combination with a camera mounted in said case with the camera lense aligned with said window including an axial rear support secured to said rear panel and abutting said camera, resilient means mounted on said rear support in contact with said camera urging said camera against said rear support in axial alignment therewith wherein the camera is secured in a cylindrical box by mounting means comprising an axial support extending integrally from a transparent rear panel including elastic straps secured to the support adapted to extend over the camera and resiliently bind the camera to the support and wherein the resilient wall is integral with a side wall of the case.

* * * * *